(12) United States Patent
Höglund et al.

(10) Patent No.: US 8,961,882 B2
(45) Date of Patent: Feb. 24, 2015

(54) MULTIFUNCTIONAL MODULE

(75) Inventors: Kasper Höglund, Rönninge (SE); Barry Johnson, Milton Keynes (GB); Tommy Noren, Veberöd (SE)

(73) Assignee: Alfa Laval Corporate AB, Lund (SE)

( * ) Notice: Subject to any disclaimer, the term of this patent is extended or adjusted under 35 U.S.C. 154(b) by 120 days.

(21) Appl. No.: 13/255,295

(22) PCT Filed: Mar. 4, 2010

(86) PCT No.: PCT/SE2010/050250
§ 371 (c)(1),
(2), (4) Date: Nov. 17, 2011

(87) PCT Pub. No.: WO2010/104457
PCT Pub. Date: Sep. 16, 2010

(65) Prior Publication Data
US 2012/0058023 A1    Mar. 8, 2012

(30) Foreign Application Priority Data
Mar. 10, 2009    (SE) ...................................... 0950137

(51) Int. Cl.
*B01J 8/02*    (2006.01)
*B01J 19/18*    (2006.01)
(Continued)

(52) U.S. Cl.
CPC .............. *B01J 19/1887* (2013.01); *B01J 10/02* (2013.01); *B01F 5/221* (2013.01); *B01J 2219/00081* (2013.01)
USPC ........... 422/129; 422/198; 422/209; 422/211; 422/212; 422/218; 422/224

(58) Field of Classification Search
CPC ........... B01J 10/02; B01D 1/22; B01D 1/222; B01D 1/223; B01D 1/24
See application file for complete search history.

(56) References Cited

U.S. PATENT DOCUMENTS 2,218,240 A * 10/1940 Hickman ....................... 202/205
3,092,180 A *  6/1963 Dahlgren ......................... 165/88
3,221,807 A * 12/1965 Johansson ....................... 165/88

(Continued)

FOREIGN PATENT DOCUMENTS

EP    0002568 A1    6/1979
EP    0021606 A1    1/1981

(Continued)

OTHER PUBLICATIONS

Office Action from corresponding Singapore Application No. 201106500-0, dated Apr. 26, 2013.

*Primary Examiner* — Jennifer A Leung
(74) *Attorney, Agent, or Firm* — MKG, LLC (57) ABSTRACT

The present invention relates to a multifunctional module comprising one or more units selected from the group consisting of reactor units, filter units, membrane units, reactor-separator units, clarificator units, purificator units, extractor units, and mixer units. The units are connected parallel or in series or both to each other, and each unit has at least one member having a surface, which surface is rotating with the member. The member is rotating around an axis making the unit operate under centrifugal force. One or more chambers for fluids are co-rotating with the rotating member. The present invention relates further to units which could be used in a spinning multifunctional module, and use of a spinning multifunctional module.

27 Claims, 8 Drawing Sheets (51) Int. Cl.
*B01J 10/02* (2006.01)
*B01F 5/22* (2006.01)

(56) References Cited

U.S. PATENT DOCUMENTS

| | | | |
|---|---|---|---|
| 4,311,750 A | | 1/1982 | Cowen et al. |
| 4,597,835 A | * | 7/1986 | Moss ............................ 203/89 |
| 4,627,890 A | | 12/1986 | Porter et al. |
| 4,657,677 A | * | 4/1987 | Roubicek et al. ............. 210/219 |
| 6,972,113 B1 | * | 12/2005 | Ramshaw et al. ............. 422/135 |
| 6,977,063 B1 | * | 12/2005 | Ramshaw et al. ............. 422/135 |
| 7,115,235 B1 | * | 10/2006 | Ramshaw et al. ............. 422/135 |
| 2005/0158220 A1 | | 7/2005 | Ramshaw et al. |

FOREIGN PATENT DOCUMENTS

| | | |
|---|---|---|
| EP | 0080328 A2 | 6/1983 |
| EP | 0320105 A1 | 6/1989 |
| EP | 1464389 A1 | 10/2004 |
| FR | 2660580 A1 | 10/1991 |
| JP | 6138621 | 2/1986 |
| WO | WO0043096 A1 | 7/2000 |
| WO | WO0048732 A1 | 8/2000 |
| WO | WO0160511 A2 | 8/2001 |

* cited by examiner

MULTIFUNCTIONAL MODULE

The present invention relates to a multifunctional module, units to be used in a multifunctional module, a process for operating a multifunctional module, and use of a multifunctional module.

BACKGROUND

Spinning reactors etc. are unusual in industrial processes even though there are several patents disclosing spinning discs. The spinning disc reactors disclosed by the patents are often complicated and not useful in full scale or pilot scale processes. The technique is utilising the centrifugal force which necessitates very careful design and demand on parts and materials, which also will be more evident when complicated chemical reactions are applied to the technique. Therefore, one problem to be solved by the present invention is how to design a spinning disc reactor module which will fulfil criteria such as mixing immiscible fluids, production of high yields, separation of products etc. Another problem is cleaning of the reactor, and thus accessibility to the interior of the reactor. Yet another problem is how to achieve multifunction to a spinning disc reactor module.

SUMMARY

Accordingly, the present invention provides in on aspect, a solution to the above mentioned technical problems by providing a spinning multifunctional module or a multifunctional module, which comprises one or more units selected from the group consisting of reactor units, filter units, membrane units, reactor-separation units, clarification units, purification units, extraction units, contactor units, and mixer units etc. The spinning multifunctional module has to have at least one unit having a member which rotates around an axis. The units of the multifunctional module can be connected parallel or in series or both to each other. The module can have one or more inlets and one or more outlets, and the module could also comprise a foundation for the units. The foundation could have connections between the units integrated in the foundation, or the connections between the units could be between the units above the foundation. A cover or a hood could cover the foundation and the units leaving the inlets and the outlets to be connected to feeds and end-product collections on the outside of the cover or hood.

The unit operations carried out by the module could be a combination of mixing, blending, reaction, separating, etc. or the module may be a combination of units within the same unit operation, thus the module could for instance separate different fractions of a mixture within a module having different separation units. A module according to the invention could as an alternative carry out one step or several step synthesis, thus be a combination of reactor units and separation units etc. The spinning multifunctional module of the invention comprises units operating under different modes, for instance a reactor unit within the module facilitates contact between reactants that a reaction can take place. A filter unit is a unit wherein a filter is one of the components, a membrane unit is a similar unit. In a filter unit or a membrane unit particles or molecules are separated from the fluids. In a reactor-separator unit reactions take place as well as separation of the product mixture. A clarification unit is a unit wherein a liquid is clarified from particles or sludge, and a purificator unit purifies for instance a fluid. An extractor unit facilitates extraction of for instance substances from one fluid to another or the extraction could be to or from a gas and/or to or from a liquid. A contractor unit could be a packed bed or a fluidised bed. A mixer unit could for instance mix two immiscible fluids to produce for instance an emulsion, or a dispersion, but other types of mixing could also be performed in a mixer unit.

The units of the multifunctional module according to the present invention may have at least one member having a surface, which surface is rotating with the member. The mentioned surface is the surface on which the operation takes place, thus the surface herein is called the operating surface or just surface. The operations could be mixing, reaction, separation etc. The rotating member could be of any type which rotates around an axis, the member could be a disc, such a member is for example a flat or planar disc herein called a T-disc. Another example is a cone-disc, which is a cone with an open end turning upwards, hereinafter called Y-disc. Yet another type of rotating member is a more complicated structure with enhanced surfaces, with two horizontal surfaces separated by a plurality of walls which surround the axis of rotation and which walls divergently extend from one horizontal surface towards the opposite horizontal surface this type of member is hereinafter called a Z-disc. Yet another type of member is the delta disc which has a shape like an upside down turned cone with the small end turning upwards, this type of member is hereinafter called Δ-disc. The rotating member according to the invention could thus be selected from one or more of T-discs, Y-discs, Z-discs, and Δ-discs. The operating surface of the rotating member could be on the outside surfaces of the T-discs, the Y-discs, the Z-discs, or the Δ-discs, or the operating surface could be integrated with the member in the form of one or more channels. The member is rotating around an axis during operation and is operating under centrifugal force, thus creating transportation of products, mixing of products, separation of components, etc., and can be performed in a number of levels and connections within the discs or between discs. The centrifugal force makes heavier components be transported out from the centre of the member to the circumferential edge or only a part of the distance to the edge of the member. The number of revolutions the member is rotating with could be adjusted to optimize the predicted operation. One or more chambers are co-rotating with the rotating member and collecting the materials from the member. The chambers can be surrounding the member's circumferential edge, or the chamber could be below the member's circumferential edge, or the chamber could be over the member's circumferential edge, or the chamber could be at the member's circumferential edge. Within the chamber could a stator be arranged opposite the rotating member. The chambers could be paring chambers having one or more paring devices which could be paring discs, paring tubes or paring passage or combinations thereof. The paring passage could be closed or open, and the paring devices are arranged to the chamber to set a surface of the fluids of the chamber to a certain pre-determined level within the rotating paring chamber. The paring devices could be connected to the paring chambers from below and thus making it possible to lead out fluids by gravitation. The feed of fluids to channels within a disc could also be arranged together with a paring tube, such an arrangement make it possible to feed fluids at different levels within a disc having several layers of channels within the disc. A feed paring tube consists of two tubes one for leading fluids into the channel and one to set the fluid surface to a pre-determined level at an inlet compartment of the disc.

One or more paring discs could be centred on the axis of the rotating member leading out fluids which are close to the centre of the surface or could the paring disc have a radius corresponding to the rotating member, and the paring disc could be a stator which is arranged opposite the rotating member. The paring discs could have any diameter all depending on fraction of the fluids which should be lead out from rotating discs. The fluids could thus be pumped up through the axis of a stator or of a rotating member by the paring discs.

The module of the present invention may also comprise one or more static separators connected to the units having rotating members. The static separators could be connected to the units parallel, or in series, or both, to the units within the module. According to this can the module consist of one or more units having rotating members and one or more static separators. The static separators could be selected from settling tanks, cyclones, coalescer, contractors, filters, membranes, affinity member. One or more high speed separators, or one or more decanter centrifuges, or combinations thereof could be connected to the units parallel, or in series, or both, to the units within the module. Then module could be a combination of the units having rotating members together with any combinations of static separators, high speed separators, and decanter centrifuges.

The present invention relates in another aspect to a reactor unit or a mixer unit. The reactor unit or the mixer unit comprise at least one rotating member having a surface, which surface is rotating with the member, and the member being selected from the group consisting of T-discs, Y-discs, Z-discs, and Δ-discs. The rotating member of the unit rotates around an axis making the unit operate under centrifugal force. The reactor unit or the mixer unit comprises also one or more inlets for fluids above the member at the centre of the disc at the axis or within a radial distance from the centre of the disc, that the fluids are mixed, or reacted or transported, or combinations thereof by radial velocity to the circumferential edge of the member. The unit comprises further one or more chambers for fluids co-rotating with the member. The chambers can be surrounding the member's circumferential edge, or the chambers can be below the member's circumferential edge, or the chambers can be over the member's circumferential edge, or the chambers can be at the member's circumferential edge.

The reactor unit or the mixer unit can comprise one or more inlets for fluids at the centre of the disc at the axis leading fluids into channels within the rotating member. The channels within the discs are going from the centre to the circumference in radial direction leading the incoming fluids to the circumferential edge. The one or more channels may communicate with each other at one or more connection places making two ore more fluids to mix and/or react with each other. The channels may be arranged on several levels in the disc. Channels of different levels can be connected to force two or more fluids to mix and/or react with each other. Two or more channels at the same level can be connected that two or more fluids could mix and/or react with each other.

The present invention relates in a further aspect to a filter unit or membrane unit comprising at least one member having a surface, which surface is rotating with the member, and the member being selected from the group consisting of T-discs, Y-discs, Z-discs, and Δ-discs. The member is rotating around an axis making the unit operate under centrifugal force, and the member comprises at least two compartments divided by a membrane or a filter or both. One or more inlets for fluids are attached above the disc surface at the centre of the disc at the axis or within the radial distance from the centre, and a part of the fluids are going through the filter or going through the membrane and being transported by radial velocity to the circumferential edge. The filter unit or the membrane unit comprises further one or more chambers for fluids co-rotating with the member. The chambers could be surrounding the member's circumferential edge, or the chambers could be below the member's circumferential edge, or the chambers could be over the member's circumferential edge, or the chambers could be at the member's circumferential edge.

The above mentioned chambers for fluids could be paring chambers having one or more paring discs, paring tubes or paring passage, or combinations thereof, arranged to the surface of the fluids within the one or more paring chambers. The paring passage could be closed or open. The paring discs, tubes or passages can be arranged to lead out the fluids from the chambers, into one or more outlets in radial direction from the member, into one or more outlets below the member, or into one or more outlets above the member, or through the axis up or down, or combinations thereof.

The present invention relates in yet another aspect to a reactor-separator unit comprising at least one member having a surface, which surface is rotating with the member, and the member being selected from the group consisting of T-discs, Y-discs, Z-discs, and Δ-discs. The member of the reactor-separator is rotating around an axis making the unit operate under centrifugal force. The unit may also comprise one or more inlets for fluids above the discs, but inlets could also be below the disc. The reactor-separator unit comprises one or more paring chambers having paring tubes which paring chambers are co-rotating with the members. The paring tubes connected to chambers will set the surface of the fluids in the chambers. The rotating members and the co-rotating chambers are arranged on the same axis as a centrifugal separator, which could be of any type and be arranged above, below or around the rotating members and the co-rotating chambers. The rotating member and the co-rotating chamber can be centred on the same axis as a centrifugal bowl having a stack of separating discs within a centrifugal rotor. The centrifugal rotor, the stack of separating discs can be centred below or above the member on the same axis. The stack of separating discs and centrifugal rotor are co-rotating with the member and the paring chambers. At least one of the paring tubes or paring passages can be connected between at least one of the paring chambers and the centrifugal rotor leading fluids into the centrifugal rotor.

The present invention relates further to an extractor unit comprising at least one member having a surface, which surface is rotating with the member, and the member being selected from the group consisting of T-discs, Y-discs, Z-discs, and Δ-discs. The member of the extractor is rotating around an axis making the unit operate under centrifugal force. The extractor unit comprises one or more paring chambers having paring tubes which paring chambers are co-rotating with the members. Inlets for fluids and gas, or liquids, are arranged that the flows are co-current of counter-current through the unit. A centrifugal rotor may have a centrifugal bowl and a stack of separating discs on the same axis as the rotating member and co-rotating chambers. The centrifugal rotor may surround the rotating member, be on top of the rotating member or below. The separating discs could thus surround the rotating member and the co-rotating chamber, or the separating discs could be below or above the rotating member. A paring tube or a paring disc could transfer fluids into the centrifugal bowl from the rotating member having the co-rotating chamber.

The above mentioned units may have a plate or a shroud centred on the axis of the member attached to cover the surface of the member or attached coextensive to the surface of the member leaving a gap between the plate or the shroud and the rotating member. The plate or the shroud could be stationary or could be rotating with a different number of revolutions than the rotating member, and the plate or shroud could be co-rotating with the rotating member or be counter-rotating with the rotating member. The shroud or plate could be heat exchanged by heat exchanging fluids. A paring disc could be discharging the fluids through the outlet in the axis of the stationary plate or the stationary shroud, or a pump could be connected to the inlet for pumping the fluids out through the outlet in the axis.

The above mentioned rotating members, i.e. the discs, of the invention could be covered by a housing, and the housing could be provided with inlets and outlets for fluids, such as liquid fluids, sols, gases, fluidised particles etc. The housing could be sealed to contain a gaseous media. The units could also be hermetically sealed. Gas tight gaskets could seal the parts and the rotating axis at the transition places between the different parts.

At least one surface of the members or at least a part of the surface of the members of the present invention could be coated with one or more catalyst.

In the following the present invention will be described with the aid of figures. FIGS. 1 to 15 are only examples of the inventions explaining the invention and are not intended to limit the scope of invention.

DETAILED DESCRIPTION

Figure 1:
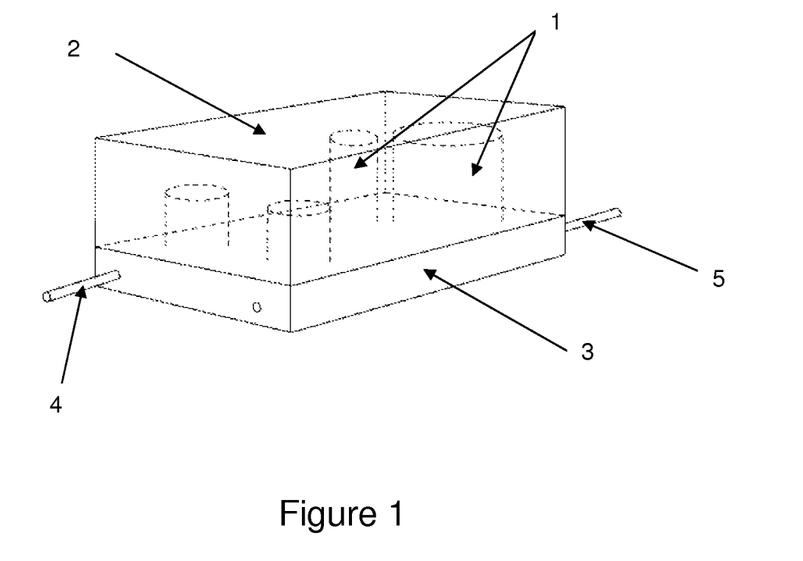
FIG. 1 shows a spinning module according to the invention

FIG. 1 shows a multifunctional module having four units 1, the units can have different sizes, be for different types of operations etc. A module could have units 1 selected from units having rotating members, i.e. the discs, of the invention, static separators, high sped separators or decanter centrifuges. In FIG. 1 the units are under a hood 2 on a foundation 3. A feed 4 into the module and a product line 5 out of the module are shown in the figure illustrating that the process module is continuous. How the units are configured in the modules depends on space, type of operations and sequence of operations, the units could be connected in series and thus the units may put in a row or the units could be placed in a square which is shown in the figure. A combination of units connected in series and parallel to each other is one alternative to the module shown in FIG. 1, another could be that all units are connected parallel. All units in a module could be "spinning" or have parts which rotate around an axis, or some of the units may be stationary units.

Figure 2:
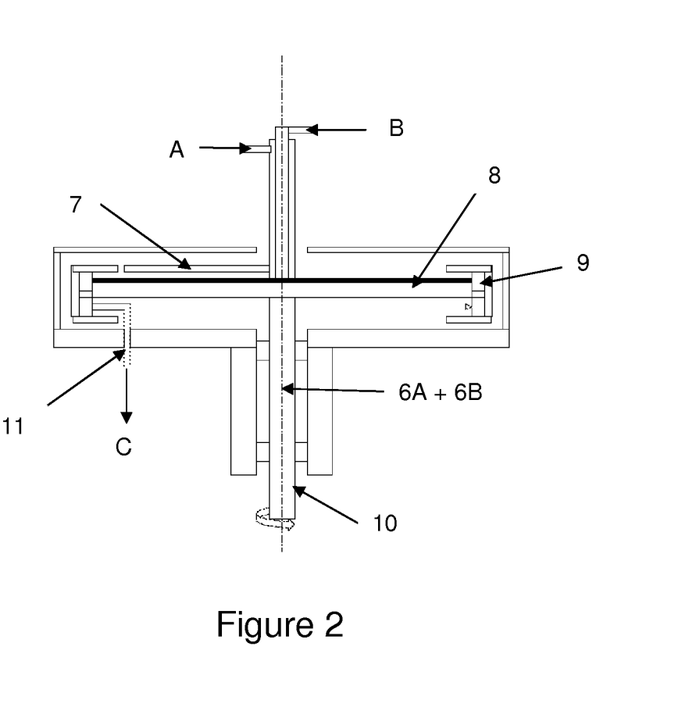
FIG. 2 shows a T-disc according to the invention

FIG. 2 shows two equipments according to the invention, in FIG. 2 two different arrangements are illustrated in the figure one on each side of the axis 6 A+B. A and B represent two different types of equipments, but A and B represent also two different feed inlets of reactants which will react with each other and form a product C. On the A side of the equipment a stator 7 is arranged above a T-disc 8. Stator 7 and T-disc 8 are arranged that a gap is made between stator 7 and T-disc 8 to facilitate room for reactions. Fluid motion created by stator 7 and disc 8 can facilitate better fluid motion for better reaction between different components in the inlet feeds. On the B side of the equipment there is no stator leaving the reaction surface open. Feeds of reactants A and B are inlet at the centre of the T-disc 8, but reactants could also be let in within a part of radial distance from the centre, the reactants start to react and mix and form a film or layer on the disc surface. Reactants and products are transported by centrifugal force to the edge of the disc where a chamber 9 collects the material. The number of revolutions the disc rotates with depends on different properties such as viscosity of reaction mixture, reaction time etc. Chamber 9 is co-rotating with T-disc 8. In FIG. 2 the disc is represented by a disc attached to a shaft 10, but according to the invention it is also included that disc 8 is not attached to a shaft instead the disc is mounted on chamber 9 which chamber is connected to the driving force of the motor according to this alternative, this alternative is not shown in the figure. A paring tube 11 is connected from below the disc to chamber 9 for transportation of product mixture C out from chamber 9. According to this placement of paring tube 11 it is possible to transport C by gravity from chamber 9. The dynamic pressure forces the fluids out of the chamber.

Figure 3:
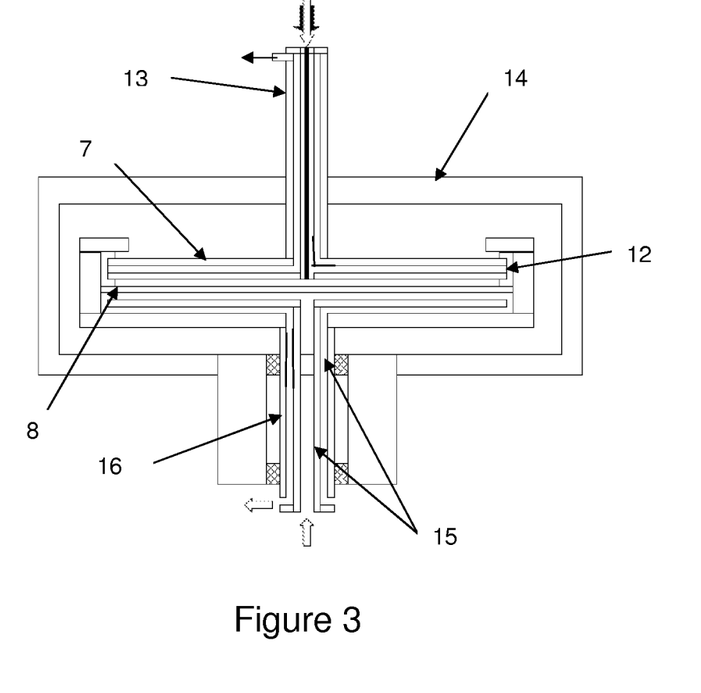
FIG. 3 shows a T-disc with a stator according to the invention

FIG. 3 shows a unit having a T-disc with a co-rotating chamber for products. The process mixture is transported by paring disc 12 from the co-rotating chamber according to this alternative of the invention, and the process mixture is then pumped out through stator shaft 13. A housing 14 is closing the disc from the surrounding that gas could be added. FIG. 3 shows also how heat to and from the units is transferred by heat exchanger fluids. The heat exchanger fluids are transported in channels 15 through rotating shaft 16 from below opposite to the process surface of disc 8. Disc 8 is according to this alternative not attached to rotating shaft 16 instead disc 8 is mounted to the co-rotating chamber. A stator 7, which could be paring disc but not necessary, is attached to stator shaft 13.

Figure 4:
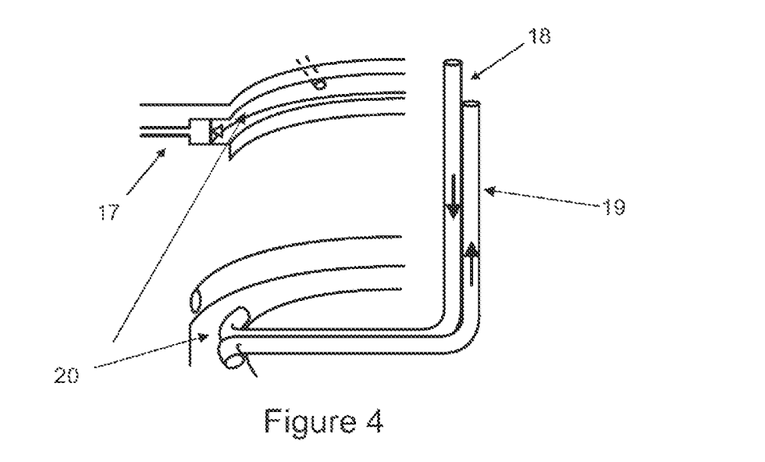
FIG. 4 shows an inlet to a T-disc having channels according to the invention.
Figure 5:
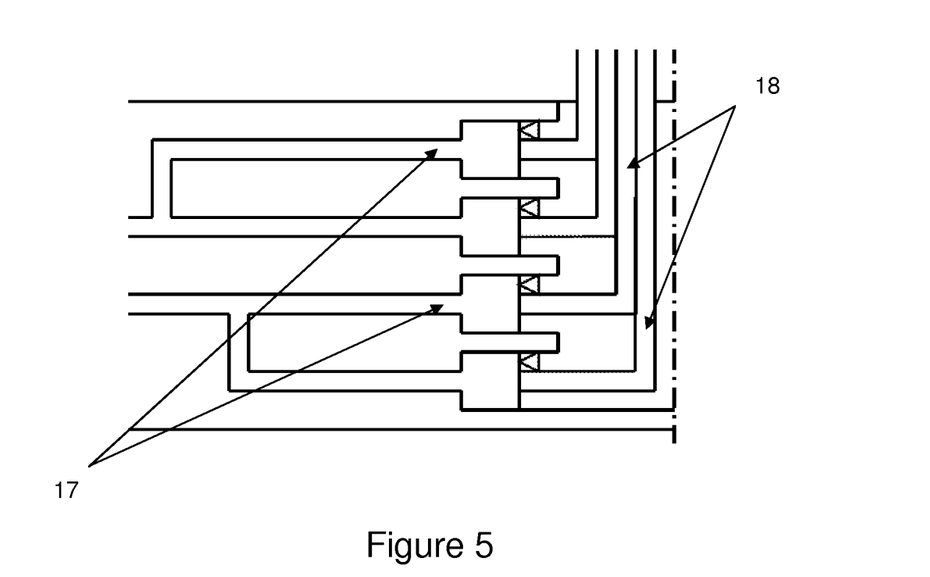
FIG. 5 shows another view of the T-disc having channels.
Figure 6:
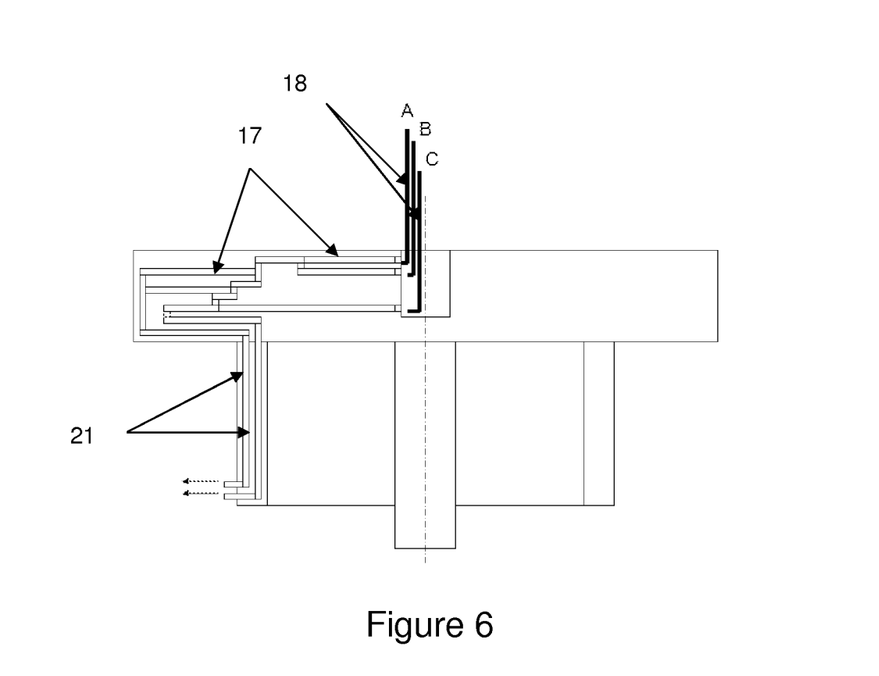
FIG. 6 shows yet another view of the T-disc having channels.

FIGS. 4, 5 and 6 show a T-disc having integrated process channels 17. Inlets 18 are feeding process fluids into channels 17. In FIG. 4 a paring tube 19 secures the surface level in a process fluid path 20 connected to channels 17. FIG. 6 shows outlet tubes 21 leading out process products from the co-rotating chambers within the disc, which are not shown in details in FIG. 6.

Figure 7:
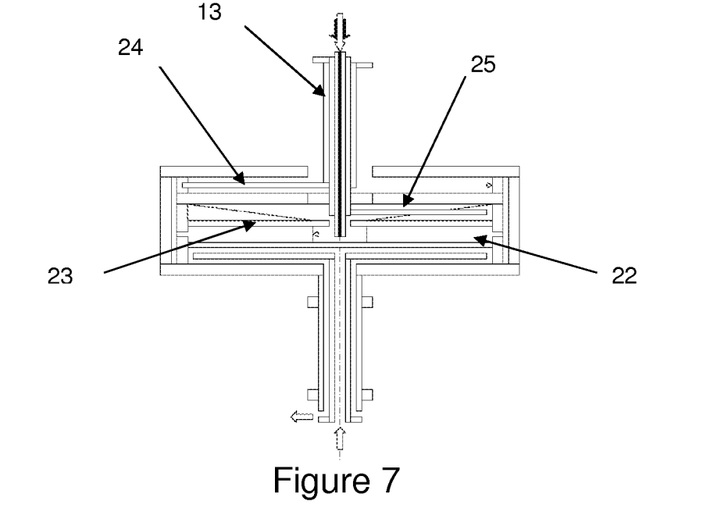
FIG. 7 shows a membrane or filter unit according to the invention.

FIG. 7 shows a filter or membrane unit according to the invention. Process fluids are lead into chamber 22 wherein a filter 23 or a membrane 23 is dividing chamber 22 into two compartments. The process fluids are separated through the filter or the membrane and both concentrate and filtrate, or permeate are transported by centrifugal force to be collected in co-rotating chambers, not shown in details in FIG. 7. A paring tube 24 is transferring concentrate from co-rotating chamber intended for collecting concentrate up through a stator shaft 13. The filtrate or the permeate is transferred by paring tube 25 up through stator shaft 13. A paring tube or paring disc will pump both concentrate and filtrate/permeate through the stator shaft. Paring discs could exchange one or both paring tubes 24 and 25 according to one alternative.

Figure 8:
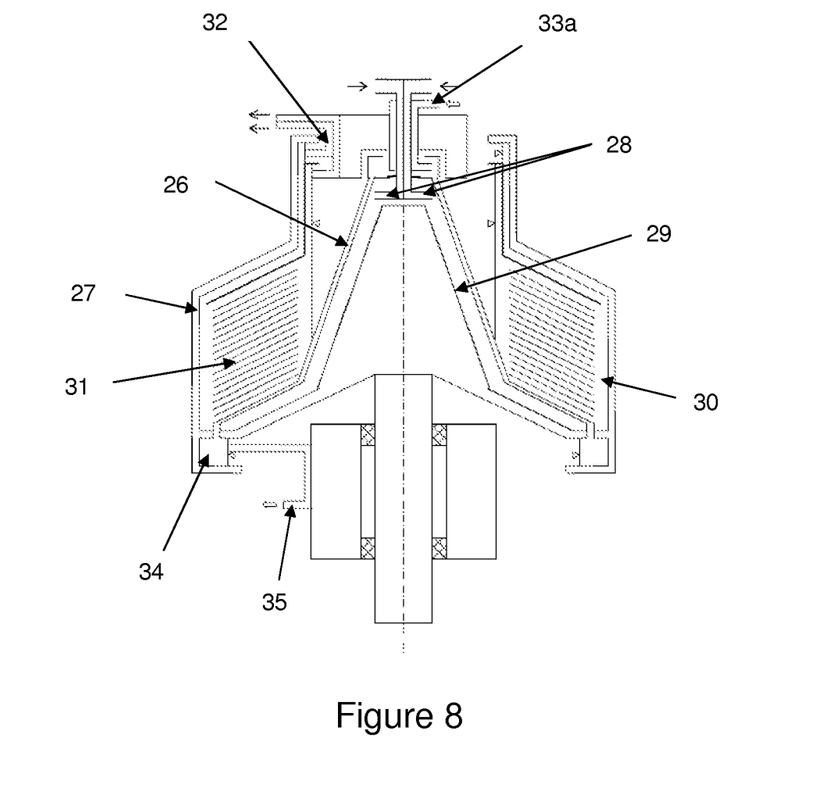
FIG. 8 shows a Δ-disc within a centrifugal separator according to the invention.

FIG. 8 shows a Δ-disc 26 within a centrifugal bowl 27 according to the invention. This alternative is without an extractor. Inlets 28 for process fluids are centred on a stator shaft feeding process fluids into a space between Δ-disc 26 and a rotor body 29. The process fluids are reacted and the product mixture is transported on the surface of Δ-disc 26 to be collected in a co-rotating chamber 30 which is according to this embodiment a centrifugal bowl 27. Within the centrifugal bowl is a stack of separating discs 31. Separating discs 31 provide an enhanced surface to the separating equipment. The product mixture is separated and the different fractions of the product mixture are pumped out of the centrifugal bowl by one or more paring discs 32. Heat exchanger fluids are feed from inlet 33a into Δ-disc 26 thus leading heat to and from the process reactions. The heat exchanged fluids are collected in a chamber 34 and transferred out by paring tube 35.

Figure 9:
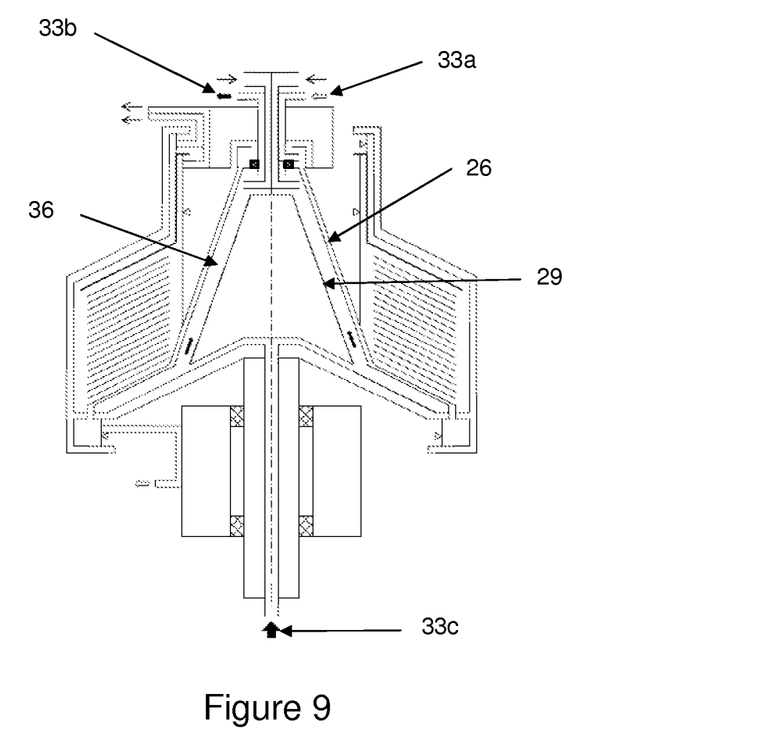
FIG. 9 shows another Δ-disc within a centrifugal separator according to the invention.

FIG. 9 shows an alternative Δ-disc with an extractor. According to this alternative can gas be feed trough an inlet or outlet through shaft 33c into or out from space 36 between Δ-disc 26 and rotor body 29 and be connected with outlet or inlet 33b and the unit will act as an extractor.

Figure 10:
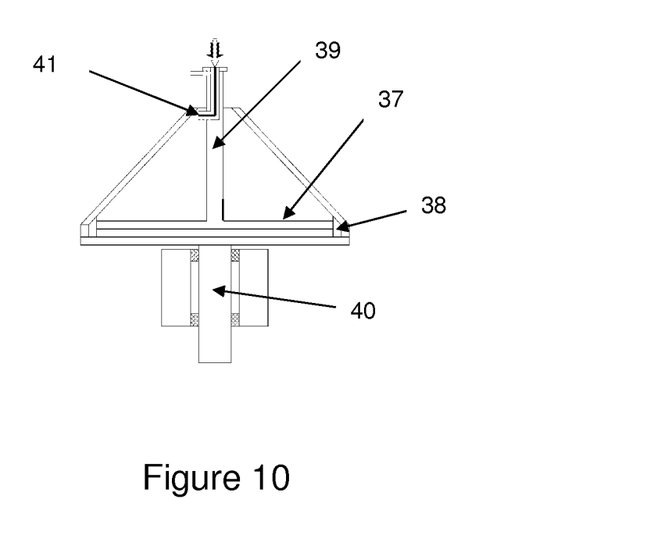
FIG. 10 shows a Δ-disc unit according to the invention.

FIG. 10 shows a Δ-disc having a paring tube 37 or a paring disc 37 at the bottom of the disc transporting process fluids from chamber 38. The fluids are transported up through the stator shaft 39. As an alternative could a paring disc be transporting fluids from chamber 38 through rotating shaft 40, not shown in FIG. 10. Feed inlets 41 are feeding the process fluids into the Δ-disc and the fluids are transferred by centrifugal force down to chamber 38 where the fluids are collected before further transportation.

Figure 11:
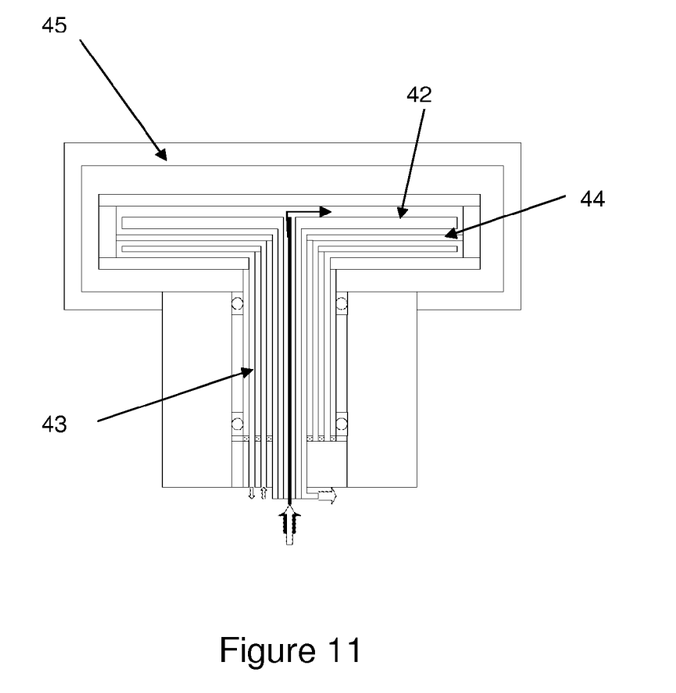
FIG. 11 shows a hermetic unit according to the invention.
Figure 12:
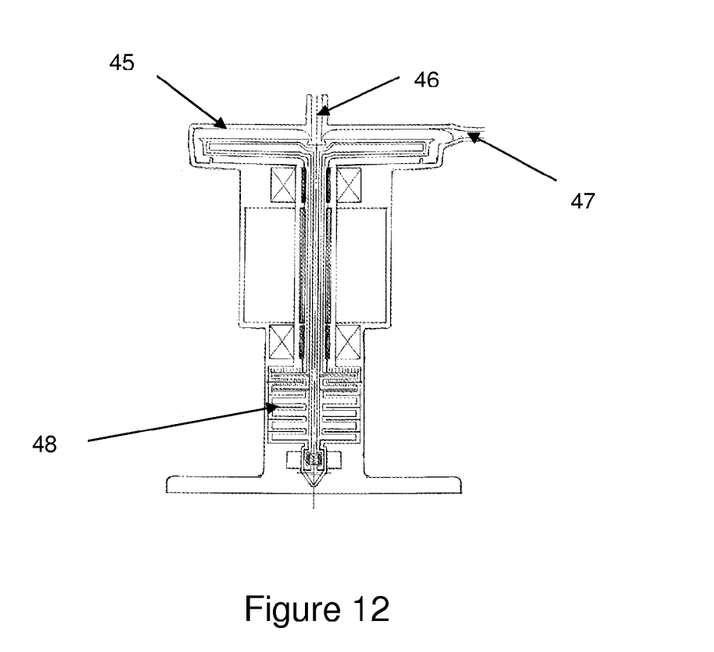
FIG. 12 shows another hermetic unit according to the invention.

FIG. 11 shows a hermetic unit having a T-disc 44. According to this version of the present invention process fluids are feed up through rotation shaft 43 to the above surface of the stator 42. The process fluids will be pumped down from the surface of T-disc 44 through rotating shaft 43 from the chamber. Heat exchanger fluids are also transported up and down through rotation shaft 43 for heat transfer to and from T-disc 44. A housing 45 is sealing the T-disc from the surrounding environment. FIG. 12 shows also a hermetic T-disc unit. According to this alternative the process fluids are feed through inlet 46 in housing 45. The process fluids are let out through outlet 47 in the housing. A heat exchanger 48 is centred on the rotating shaft to heat exchange the heat exchanging fluids internally to and from the T-disc.

Figure 13:
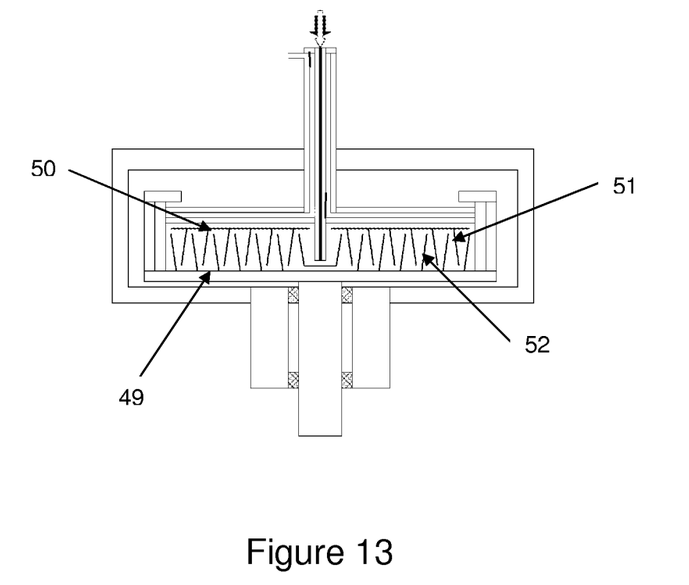
FIG. 13 shows a Z-disc according to the invention.

FIG. 13 shows a Z-disc having two horizontal surfaces 49 and 50 separated by a plurality of walls 51 and 52. Walls 51 and 52 surround the axis of rotation and divergently extend from one horizontal surface towards the opposite horizontal surface.

Figure 14:
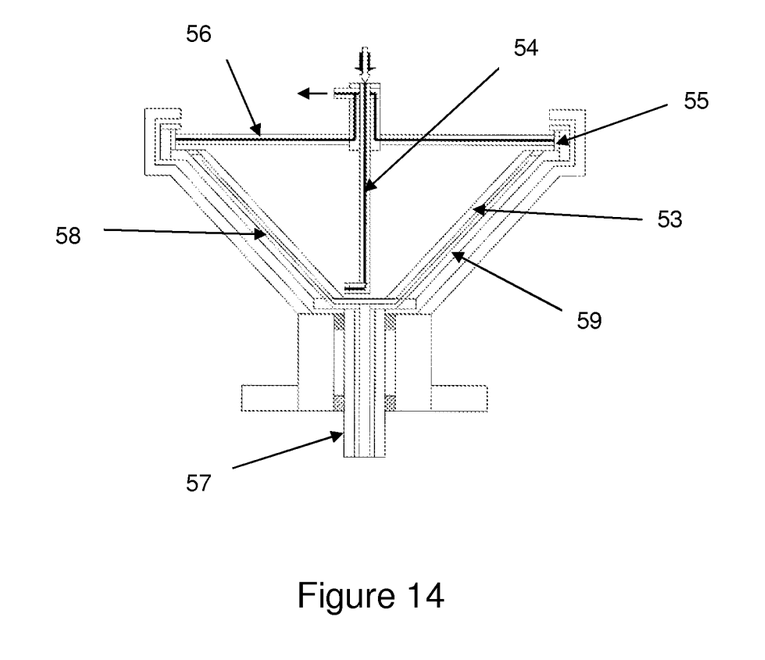
FIG. 14 shows a Y-disc according to the invention.

FIG. 14 shows a Y-disc 53 according to the invention. Process fluids are feed through inlet 54 from above the Y-disc. The process fluids are let out at the bottom surface of the Y-disc. By centrifugal force are the fluids forced up on the surface of the y-disc and collected in chamber 55. A paring disc 56 or a paring tube 56 is transferring the fluids from chamber 55. The Y-disc is cold or heated by heat exchanger fluids, which are let in and out through shaft 57 into a space 58 between the Y-disc and rotor 59.

Figure 15:
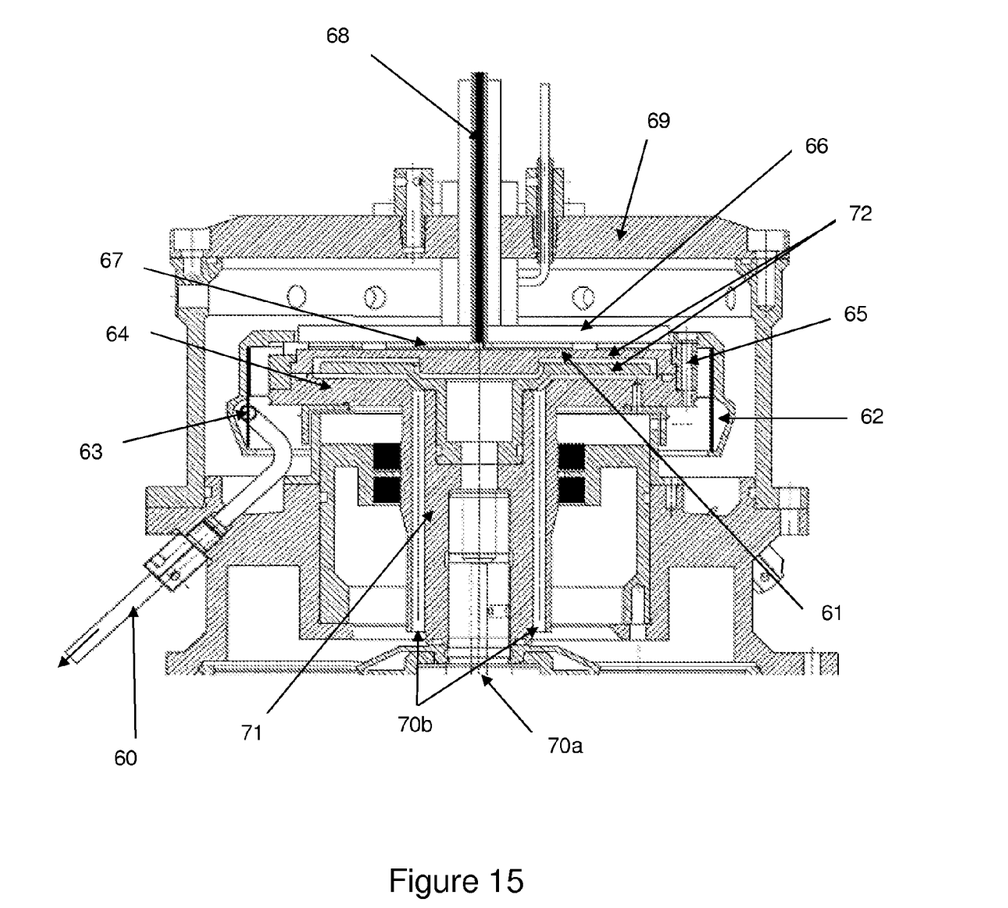
FIG. 15 shows detailed drawing of a paring tube located under a T-disc according to the invention.

FIG. 15 shows a more detailed figure of an unit having a paring tube 60 located under a T-disc 61 for transportation of fluids out from a paring chamber 62, there may be more than one paring tube 60 located under the disc. In this figure it is shown how paring tube 60 sets fluids surface 63 on a predetermined level depending on the position of paring tube 60 in chamber 62. In this figure T-disc 61 is mounted on a rotor body 64. The figure shows also that paring chamber 62 is attached to rotor body 64 by one or more bolts 65. A stator 66, according to this alternative, is placed over T-disc 61 leaving a gap 67 for fluids, which fluids are feed through inlet 68 in the stator shaft. According to another alternative, not shown in FIG. 15, can the stator be redundant leaving the rotating fluid surface open under housing cover 69. According to another alternative, not shown in FIG. 15, can stator 66 be a paring disc, but then may paring tube 60 be redundant in some applications, but not necessary. In case of a paring disc then T-disc 61 is mounted in such way that chamber 62 will cover T-disc 61 and the paring disc. According to this alternative will the fluids from chamber 62 be pumped up through housing cover 69 by the paring disc. FIG. 15 shows inlets 70a and outlets 70b for heat exchanger fluids, which are arranged in rotating shaft 71 letting the heat exchanger fluids be pumped to channels 72 under T-disc 61 to heat or to cool the disc. The shape of the disc according to the alternative, which is shown in FIG. 15, is T-disc 61 in form of a plate mounted on a rotor body 64, but according to other alternatives may the shape of the disc be a T-disc, Y-disc, Z-disc, or a Δ-disc. The shape of the disc is dependent on the purpose of the unit and FIG. 15 shows a T-disc but the invention is not limited to this version. When a T-disc, Y-disc, Z-disc, or a Δ-disc is used, all of these types of the discs are mounted on rotor body 64 and not on a rotating shaft, of course can the discs be mounted on a rotating shaft but not according to the alternatives of FIG. 15. Therefore, the Y-disc will be a cone shaped bowl with the smaller end in downward direction, the Δ-disc will also have a cone shape but in this alternative is the smaller end in the upward direction. The Z-disc could be turned both ways since there is symmetry in the disc. Paring chamber 62 is mounted together with the selected disc on rotor body 64 covering the disc and the rotor body according to these alternatives of the invention. Depending on which disc is used paring chamber 62 have different sizes to be able to cover both disc and rotor body. Housing cover 69 can have one or more feed inlets and/or one or more feed outlets, none of these are shown in FIG. 15 except feed inlet 68 which is one alternative. As another alternative, not seen in FIG. 15, can a centrifugal rotor having a centrifugal bowl and a stack of separating discs be centred on the same axis as the disc and paring chamber 62. The centrifugal rotor may surround the disc, or be on top of the disc or below the disc. The separating discs could thus surround the disc, or the separating discs could be below or above disc 61. A paring tube or a paring disc could transfer fluids into the centrifugal bowl from chamber 62 when the centrifugal bowl is below disc 61. When the centrifugal bowl is above disc 61 then a paring disc could pump fluids from paring chamber 62 into the centrifugal bowl. According to the alternatives of the invention presented in FIG. 15 the selection of disc 61 is flexible allowing the unit to be put together depending on the purpose of the unit. The unit is thus very flexible and adaptable.

What is claimed is:

1. A reactor unit or a mixer unit comprising at least one disc having an operating surface, the at least one disc being selected from the group consisting of T-discs, Y-discs, Z-discs, and Δ-discs, said at least one disc is configured to be rotatable around an axis, the reactor unit or the mixer unit comprises one or more inlets for fluids, the one or more inlets for fluids being positioned above the operating surface of the at least one disc at a center defined by the at least one disc at the axis or within a radial distance from the center of the at least one disc, that the fluids are mixed, or reacted or transported, or combinations thereof by centrifugal force on the operating surface to a circumferential edge defined by the at least one disc, wherein the unit also comprises one or more chambers configured to co-rotate co-rotating with the at least one disc, fluids from the operating surface are collected in the one or more chambers configured to co-rotate with the at least one disc, and said one or more chambers are surrounding the circumferential edge, or the one or more chambers are below the circumferential edge, or the one or more chambers are over the circumferential edge, or the one or more chambers are at the circumferential edge, wherein the one or more chambers are one or more paring chambers configured to co-rotate with the at least one disc, the one or more paring chambers having one or more paring devices, and wherein the one or more paring devices are one or more paring discs, one or more paring tubes or one or more paring passage, or combinations thereof, arranged to a surface of the fluids within the one or more paring chambers, and are arranged to lead the fluids out of the one or more paring chambers; and wherein the one or more paring devices are connected to the one or more paring chambers from below the at least one disc and the one or more paring devices having a paring device inlet that extends into the one or more paring chambers at a position below the at least one disc, the paring device inlet cooperates with rotation of the one or more paring chambers to establish a radially oriented fluid surface in the one or more paring devices so that the fluids are led out of the one or more paring chambers by gravitational force; and     a shroud centered on the axis of the at least one disc attached to cover the operating surface of the at least one disc or attached to coextensive with the operating surface of the at least one disc leaving a gap between the shroud and the at least one disc, wherein the shroud is co-rotatable or counter-rotatable with the at least one disc with a different number of revolutions.

2. A unit according to claim 1, wherein the one or more paring devices are arranged to set fluids surfaces on predetermined levels in the one or more paring chambers, and the one or more paring devices being arranged to lead out the fluids from the one or more chambers, into one or more outlets in radial direction from the at least one disc, into one or more outlets below the at least one disc, or combinations thereof.

3. A unit according to claim 1, wherein the one or more paring devices are the one or more paring discs and the one or more paring discs are transporting the fluids through an outlet in the axis of the plate or the shroud, or a pump is connected to the one or more inlets for fluids for pushing the fluids out through the outlet in the axis.

4. A unit according to claim 1, wherein channels or chambers for fluids are integrated with the at least one discs or below the at least one discs, which fluids are pumped from below the at least one discs at or within the axis providing heat transfer to and from the at least one discs.

5. A unit according to claim 4, wherein the fluids being lead through a heat exchanger centred on the axis below the at least one disc.

6. A unit according to claim 1, wherein the unit also comprises pumps for pumping fluids.

7. A unit according to claim 1, wherein the at least one disc is covered by a housing, and the housing is provided with the one or more inlets for fluids and outlets for the fluids.

8. A unit according to claim 1, wherein at least a part of the operating surface of the at least one disc is coated with a catalyst.

9. The unit according to claim 1, wherein all of the one or more paring devices are one or more paring tubes and an entire amount of the one or more paring tubes is positioned below the at least one disc.

10. The unit according to claim 1, wherein the paring device inlet is configured to receive the fluid rotating with the one or more paring chambers and centrifugal forces associated therewith.

11. A reactor unit or a mixer unit comprising at least one disc having an operating surface, the at least one disc being selected from the group consisting of T-discs, Y-discs, Z-discs, and Δ-discs, said at least one disc is configured to be rotatable around an axis, and wherein the reactor unit or the mixer unit also comprises one or more inlets for fluids at a center defined by the at least one disc at the axis, and said operating surface of the at least one disc having channels within the at least one disc extending radially from the center to a circumferential edge defined by the at least one disc, the channels being configured to lead fluids to the circumferential edge, and wherein the unit comprises one or more chambers configured to co-rotate with the at least one disc, fluids from the operating surface are collected in the one or more chambers, and wherein one or more of the channels communicate with each other, and the one or more chambers are surrounding the circumferential edge, or the one or more chambers are below the circumferential edge, or the one or more chambers are over the circumferential edge, or the one or more chambers are at the circumferential edge, wherein the one or more chambers which are one or more paring chambers configured to co-rotate with the at least one disc, the one or more paring chambers having one or more paring devices, and wherein the one or more paring devices are one or more paring discs, one or more paring tubes or one or more paring passage, or combinations thereof, arranged to a surface of the fluids within the one or more paring chambers, and are arranged to lead out the fluids from the one or more chambers; and wherein the one or more paring devices are connected to the one or more paring chambers from below the at least one disc and the one or more paring devices having a paring device inlet that extends into the one or more paring chambers at a position below the at least one disc, the paring device inlet cooperates with rotation of the one or more paring chambers to establish a radially oriented fluid surface in the one or more paring devices so that the fluids are led out of the one or more paring chambers by gravitational force; and     a shroud centered on the axis of the at least one disc attached to cover the operating surface of the at least one disc or attached to coextensive with the operating surface of the at least one disc leaving a gap between the shroud and the at least one disc, wherein the shroud is co-rotatable or counter-rotatable with the at least one disc with a different number of revolutions.

12. A unit according to claim 11, wherein the one or more paring devices are arranged to set fluids surfaces on predetermined levels in the one or more paring chambers, and the one or more paring devices being arranged to lead out the fluids from the one or more chambers, into one or more outlets in radial direction from the at least one disc, into one or more outlets below the at least one disc, or combinations thereof.

13. A unit according to claim 11, wherein the one or more paring devices are the one or more paring discs and the one or more paring discs are transporting the fluids through an outlet in the axis of the plate or the shroud, or a pump is connected to the inlet for pushing the fluids out through the outlet in the axis.

14. A unit according to claim 11, wherein channels or chambers for fluids are integrated with the at least one discs or below the at least one discs, which fluids are pumped from below the at least one discs at or within the axis providing heat transfer to and from the at least one discs.

15. A unit according to claim 14, wherein the fluids being lead through a heat exchanger centred on the axis below the at least one disc.

16. A unit according to claim 11, wherein the unit also comprises pumps for pumping fluids.

17. A unit according to claim 11, wherein the at least one disc is covered by a housing, and the housing is provided with the one or more inlets for fluids and outlets for the fluids.

18. A unit according to claim 11, wherein at least a part of the operating surface of the at least one disc is coated with a catalyst.

19. The unit according to claim 11, wherein all of the one or more paring devices are one or more paring tubes and an entire amount of the one or more paring tubes is positioned below the at least one disc.

20. The unit according to claim 11, wherein the paring device inlet is configured to receive the fluid rotating with the one or more paring chambers and centrifugal forces associated therewith.

21. A reactor unit or mixer unit comprising:
   at least one disc having an operating surface, the operating surface being configured to have operations take place thereon, the at least one disc being configured to rotate about an axis;
   at least one chamber configured to co-rotate with the at least one disc, the at least one chamber being configured to collect fluids from the operating surface, wherein the at least one chamber is at least one paring chamber configured to co-rotate with the at least one disc, the at least one paring chamber surrounds a circumferential edge defined by the at least one disc or the at least one paring chamber is positioned below the circumferential edge or the at least one paring chamber is positioned above the circumferential edge or the at least one paring chamber is positioned at the circumferential edge; and
   wherein the reactor unit or the mixer unit comprises at least one paring tube in communication with the paring chambers from below the at least one disc and the at least one paring tube having a paring tube inlet that extends into the paring chambers at a position below the at least one disc, the paring tube inlet cooperates with rotation of the paring chambers to establish a radially oriented fluid surface in the at least one paring tube so that the fluids are lead out of the paring chamber by gravitational force; and
   a shroud centered on the axis of the at least one disc attached to cover the operating surface of the at least one disc or attached to coextensive with the operating surface of the at least one disc leaving a gap between the shroud and the at least one disc, wherein the shroud is co-rotatable or counter-rotatable with the at least one disc with a different number of revolutions.

22. The unit according to claim 21 wherein the at least one disc is a T-disc.

23. The unit according to claim 21 wherein the at least one disc is a Y-disc.

24. The unit according to claim 21 wherein the at least one disc is a Z-disc.

25. The unit according to claim 21 wherein the at least one disc is a $\Delta$-disc.

26. The unit according to claim 21, wherein an entire amount of the at least one paring tube is positioned below the at least one disc.

27. The unit according to claim 21, wherein the paring tube inlet is configured to receive the fluid rotating with the at least one paring chamber and centrifugal forces associated therewith.

* * * * *